(12) United States Patent
Chen et al.

(10) Patent No.: US 9,894,285 B1
(45) Date of Patent: Feb. 13, 2018

(54) REAL-TIME AUTO EXPOSURE ADJUSTMENT OF CAMERA USING CONTRAST ENTROPY

(71) Applicant: HRL Laboratories, LLC, Malibu, CA (US)

(72) Inventors: Zhichao Chen, Woodland Hills, CA (US); Yang Chen, Westlake Village, CA (US); Deepak Khosla, Camarillo, CA (US); Darrel J. VanBuer, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/972,033

(22) Filed: Dec. 16, 2015

Related U.S. Application Data

(60) Provisional application No. 62/236,074, filed on Oct. 1, 2015.

(51) Int. Cl.
| | |
|---|---|
| H04N 5/228 | (2006.01) |
| H04N 5/235 | (2006.01) |
| H04N 5/335 | (2011.01) |
| H04N 5/243 | (2006.01) |
| G06T 7/00 | (2017.01) |
| G06T 5/20 | (2006.01) |

(52) U.S. Cl.
CPC ............ *H04N 5/2353* (2013.01); *G06T 5/20* (2013.01); *G06T 7/0081* (2013.01); *H04N 5/243* (2013.01); *H04N 5/3355* (2013.01); *G06T 2207/20021* (2013.01); *G06T 2207/20104* (2013.01)

(58) Field of Classification Search
CPC .......................... H04N 5/2353; H04N 5/243
USPC ........................................................ 348/362
See application file for complete search history.

(56) References Cited

U.S. PATENT DOCUMENTS

| | | | | |
|---|---|---|---|---|
| 2002/0090127 A1* | 7/2002 | Wetzel | ................... | G01B 7/003 382/133 |
| 2006/0233427 A1* | 10/2006 | Hauke | ................ | G06K 9/00033 382/124 |
| 2007/0216787 A1* | 9/2007 | Lin | .................... | H04N 5/23212 348/252 |
| 2010/0182417 A1* | 7/2010 | Takagi | ............... | G01N 21/6458 348/79 |
| 2011/0085744 A1* | 4/2011 | Reibman | ............... | G06T 7/0002 382/275 |
| 2012/0082367 A1* | 4/2012 | Byun | .................... | G06T 7/0002 382/149 |

(Continued)

OTHER PUBLICATIONS

T. Jiang, K. Kuhnert, D.Nguten and L. Kuhnert. Multiple templates auto exposure control based on luminance histogram for onboard camera, IEEE International Conference on Computer Science and Automation Engineering (CSAE), pp. 237-241, 2011.

(Continued)

*Primary Examiner* — Usman Khan
(74) *Attorney, Agent, or Firm* — Tope-McKay & Associates

(57) ABSTRACT

Described is system for real-time automated exposure adjustment of a camera using contrast entropy. Multiple images are captured using an image sensor, where each of the images is captured at a distinct exposure value. A contrast entropy is determined for each of the multiple images. An image having the largest contrast entropy is selected among the images and output.

19 Claims, 7 Drawing Sheets
(3 of 7 Drawing Sheet(s) Filed in Color)

(56) References Cited

U.S. PATENT DOCUMENTS

| | | | | |
|---|---|---|---|---|
| 2012/0128226 A1* | 5/2012 | John | A61B 6/481 | 382/132 |
| 2012/0281922 A1* | 11/2012 | Yamada | H04N 5/23254 | 382/201 |
| 2012/0320159 A1* | 12/2012 | Torres | G06T 7/0006 | 348/46 |
| 2013/0215299 A1* | 8/2013 | Imamura | H04N 9/045 | 348/272 |
| 2013/0250144 A1* | 9/2013 | Takayama | H04N 5/265 | 348/239 |
| 2013/0342676 A1* | 12/2013 | Amano | H04N 7/18 | 348/86 |
| 2014/0015933 A1* | 1/2014 | Sato | G02B 21/365 | 348/46 |
| 2014/0132834 A1* | 5/2014 | Kondo | G06T 3/40 | 348/441 |
| 2015/0153559 A1* | 6/2015 | Sato | G02B 21/367 | 348/79 |
| 2015/0161771 A1* | 6/2015 | Hiasa | G06K 9/6201 | 382/195 |
| 2015/0170389 A1* | 6/2015 | Ming | G06K 9/00684 | 382/284 |
| 2015/0227815 A1* | 8/2015 | Komatsu | G06T 7/0069 | 382/106 |
| 2015/0234148 A1* | 8/2015 | Kusaka | G02B 7/34 | 348/349 |
| 2015/0244931 A1* | 8/2015 | Ichikawa | H04N 5/2356 | 348/239 |
| 2015/0309284 A1* | 10/2015 | Kagawa | G02B 23/2453 | 348/76 |
| 2016/0014397 A1* | 1/2016 | Konno | H04N 13/0296 | 348/49 |

OTHER PUBLICATIONS

C. Zhang. Z. You and S. Yu: An automatic exposure algorithm based on information entropy. Proceedings of the international society for optics and photonics SPIE, 2006.

H. Lu, H.Zhang, S. Yang and Z. Zheng. Camera parameters auto-adjusting technique for robust robot vision, IEEE International Conference on Robotics and Automation (ICRA), pp. 1518-1523, 2010.

M. Rahman, N. Kehtamavaz and Q. Razlighi. Using image entropy maximum for auto exposure. Journal of electronic imaging, pp. 013007-1-013007-10, 2011.

T. Kuno and H. Sugiura: A new automatic exposure system for digital still cameras. IEEE Trans. on Consumer Electronics, vol. 44, No. 1, pp. 192-199, 1998.

J. Liang, Y. Qin, Z. Hong: An auto-exposure algorithm for detecting high contrast lighting conditions IEEE 7th International Conference on ASIC, pp. 725-728, 2007.

M. Cho, S. Lee and B. Nam: The fast auto exposure algorithm based on the numerical analysis. SPIE Conference on Sensors, Cameras, and Applications for Digital Photography, pp. 93-99, 1999.

N. Vatani and J. Roberts, Automatic camera exposure control, Australasian Conference on Robotics and Automation, 2007.

T Kalinke, C Tzomakas. A texture-based object detection and an adaptive model-based classification. IEEE International Conference on Intelligent Vehicles, pp. 143-148, 1998.

N. Subudhi, K. Nanda, A. Ghosh, Entropy based region selection for moving object detection. Pattern Recognition Letters, pp. 2097-2108, 2011.

Shannon, Claude E. (1948). "A Mathematical Theory of Communication". Bell System Technical Journal 27 (3): pp. 379-423.

* cited by examiner

REAL-TIME AUTO EXPOSURE ADJUSTMENT OF CAMERA USING CONTRAST ENTROPY

GOVERNMENT LICENSE RIGHTS

This invention was made with government support under U.S. Government Contract Number W31 P4Q-08-C-0264. The government has certain rights in the invention.

CROSS-REFERENCE TO RELATED APPLICATIONS

This is also a Non-Provisional application of U.S. Provisional Application No. 62/236,074, filed in the United States on Oct. 1, 2015, entitled, "Real-Time Auto Exposure Adjustment of Camera Using Contrast Entropy," the entirety of which is hereby incorporated by reference as though fully set forth herein.

FIELD OF INVENTION

The present invention relates to a system for automatic exposure adjustment of an image sensor and, more particularly, to a system for automatic exposure adjustment of an image sensor using contrast entropy.

BACKGROUND OF THE INVENTION

Scene luminance in an image can vary greatly over a vast range from bright sunlight to dark starlight. In order to capture the details in an image, a robust auto exposure control for image sensors is needed. The function of auto exposure (AE) is to allow an image sensor (e.g., camera) to automatically adapt to the surrounding illumination level and then help improve the overall system performance.

In recent years, several approaches for auto exposure control have been developed. The brightness of the output image is widely used as an important cue. Most auto exposure processes assume that the brightness of images and the exposure values of a camera have an approximately linear relation under variable background luminance (see the List of Incorporated Cited Literature References, Literature Reference Nos. 5 and 6). Unfortunately, this is certainly not true for a nonlinear image sensor. However, even for a linear image sensor, this assumption cannot hold since the brightness range of the camera is usually smaller than that of the scene. For example, the pixel value might be saturating, resulting in overexposure.

Additional approaches are based on the assumption that the exposure value corresponding to the median brightness provides the optimal value. These approaches either maintain the mean pixel-brightness of an image to a certain brightness value (see Literature Reference No. 7) or make as much of the image as possible appear in the middle region of a brightness histogram (see Literature Reference No. 8). However, it is difficult to obtain an appropriate image luminance under backlighting or excessive front lighting conditions where the luminance difference between the main object and the background is large. When the contrast of an object is high, a bright area is saturated and a dark area is masked.

An alternative strategy to address image brightness is to use image entropy, which is a measurement of image information content and has been used in many image processing applications. Some researchers have reported that image entropy can be used to measure the quantity of attention for a region of interest and, therefore, improve object detection (see Literature Reference Nos. 9 and 10). Existing entropy-based auto exposure control approaches assume that maximizing information entropy leads to maximal information content of images. Brightness entropy or RGB (red, green, blue) color entropy are used as image entropy (see Literature Reference Nos. 2, 3, and 4). Since optimal camera parameters are obtained by maximizing image content, these methods can work with any type of image sensor and robustly handle difficult light conditions. However, existing entropy-based processes may not focus on a region of interest, which may result in under-exposure and loss of information in the major interest area.

Thus, a continuing need exists for an auto exposure adjustment system that improves image quality and provides the ability to focus on a region of interest in an image.

SUMMARY OF THE INVENTION

The present invention relates to a system for automatic exposure adjustment of an image sensor and, more particularly, to a system for automatic exposure adjustment of an image sensor using contrast entropy. The system comprises one or more processors and a memory having instructions such that when the instructions are executed, the one or more processors perform multiple operations. The system captures a plurality of images using an image sensor, each of the images is captured at a distinct exposure value. A contrast entropy for each of the plurality of images is determined, and the system outputs a selected image from the plurality of images, the selected image having the largest contrast entropy among the plurality of images.

In another aspect, each of the plurality of images comprises a plurality of subsections, wherein determining the contrast entropy for each of the plurality of images further comprises applying a weighted value to the contrast entropy of each subsection of each of the plurality of images.

In another aspect, the plurality of subsections are weighted based on regions of interest in each image.

In another aspect, the exposure value is adjusted quickly when its corresponding contrast entropy value is not close to a maximal value $E_{max}$.

In another aspect, the exposure value is adjusted slowly when its corresponding contrast entropy value is close to a maximal value $E_{max}$.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

Figure 1:
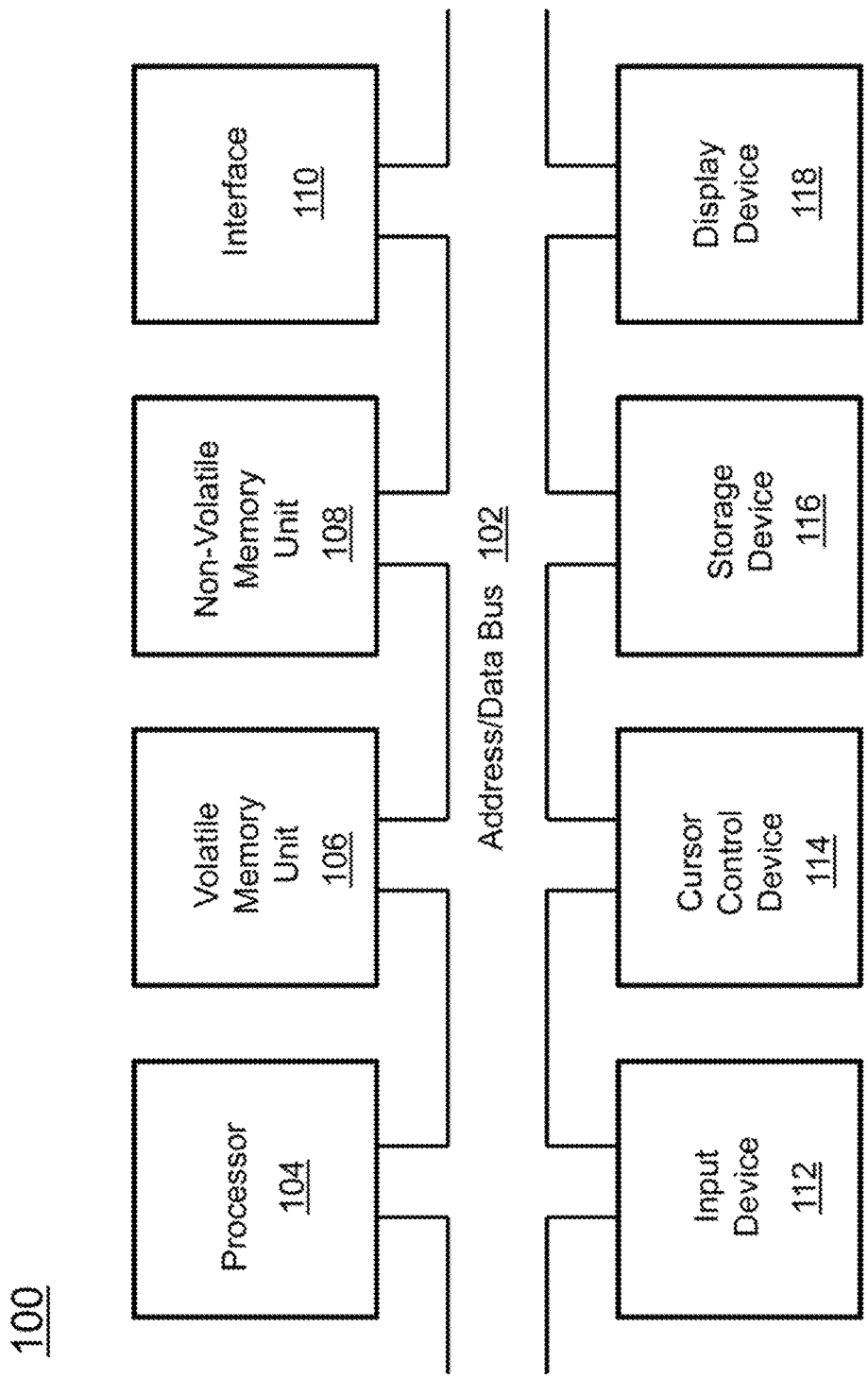
FIG. 1 is a block diagram depicting the components of a system for automatic exposure adjustment of an image sensor according to the principles of the present invention.

The present invention relates to a system for automatic exposure adjustment of an image sensor and, more particularly, to a system for automatic exposure adjustment of an image sensor using contrast entropy. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention, is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) LIST OF INCORPORATED CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. T. Jiang, K. Kuhnert, D. Nguten and L. Kuhnert. Multiple templates auto exposure control based on luminance histogram for onboard camera, IEEE International Conference on Computer Science and Automation Engineering (CSAE), 2011.
2. C. Zhang. Z. You and S. Yu: An automatic exposure algorithm based on information entropy. Proceedings of the international society for optics and photonics SPIE, 2006.
3. H. Lu, H. Zhang, S. Yang and Z. Zheng. Camera parameters auto-adjusting technique for robust robot vision, IEEE International Conference on Robotics and Automation (ICRA), 2010.
4. M. Rahman, N. Kehtarnavaz and Q. Razlighi. Using image entropy maximum for auto exposure. Journal of Electronic Imaging, 2011.
5. T. Kuno and H. Sugiura: A new automatic exposure system for digital still cameras. IEEE Trans. on Consumer Electronics, Vol. 44, No. 1, 1998.
6. J. Liang, Y. Qin, Z. Hong: An auto-exposure algorithm for detecting high contrast lighting conditions. IEEE 7th International Conference on ASIC, 2007.
7. M. Cho, S. Lee and B. Nam: The fast auto exposure algorithm based on the numerical analysis. SPIE Conference on Sensors, Cameras, and Applications for Digital Photography, 1999.
8, N. Vatani and J. Roberts, Automatic camera exposure control, Australasian Conference on Robotics and Automation, 2007.
9. T. Kalinke, C. Tzomakas. A texture-based object detection and an adaptive model-based classification. IEEE International Conference on Intelligent Vehicles, 1998.
10. N. Subudhi, K. Nanda, A. Ghosh. Entropy based region selection for moving object detection. Pattern Recognition Letters, 2011,
11. Shannon, Claude E. (1948). "A Mathematical Theory of Communication". Bell System Technical Journal 27 (3): 379-423.

(2) PRINCIPAL ASPECTS

The present invention has three "principal" aspects. The first is a system for automatic exposure adjustment of a camera using contrast entropy. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, tae non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
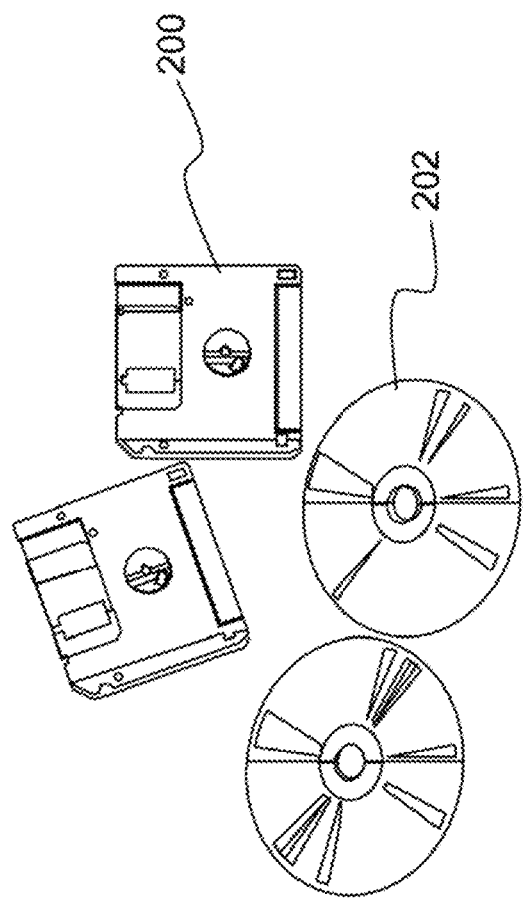
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF THE INVENTION

Described is a system that improves auto exposure control by using contrast-based entropy to measure the output image quality. The present invention is an automated method for auto exposure that only collects one image at a computed optimal exposure value. For some embodiments, it was hypothesized that contrast-based entropy would better represent the content information of an output image and result in better performance for auto exposure applications. Additionally, for some embodiments, it was assumed that the output image with the highest contrast entropy indicates that the exposure value (EV) of the camera is properly set, and maximum information content is included in the image. To minimize the effect of sky in an image (i.e., a region that is not of interest), an image is divided into multiple regions (e.g., nine), and weighted more in the region of interest. The region of interest can be determined in multiple ways. For example, an operator can use a graphical user interface (GUI) to set upper and lower bounds in the image (e.g., by using a mouse or touchscreen to select an upper bound and/or a lower bound) or select certain regions (e.g., rectangular regions, rounded, or circular regions, such as by clicking or touching an area of interest) of the image for processing. Additionally, the region of interest could be determined by estimating a horizontal line (manually or automatically) where the portion of the image below the horizontal line is identified as the region of interest.

As will be described in further detail below, experimental results of the system according to the principles of the present invention showed that the contrast entropy-based auto exposure (AE) system of the present invention outperforms popular AE approaches using brightness entropy or RGB color entropy and could significantly improve the output image quality.

(3.1) Image Entropy

Image entropy can be used to measure the information content of an image. According to Shannon's information theory, the more the information content, the larger the entropy value. Shannon's information theory is described in Literature Reference No. 11. Unlike popular approaches, which are based on brightness or color, the system according to the principles of the present invention calculates the image entropy by contrast. The fraction of a number of pixels at a certain contrast level over the total number of pixels is regarded as a probability $P_c$. The image gradient is used to measure the contrast.

The gradient magnitude is the slope of the image contrast. For instance, if two regions have different intensities, I1 and I2 and the distance between them is d, then the gradient is (I1−I2)/d. The gradient magnitude can be computed for the entire image (i.e., at every pixel) if one is interested in the best quality of the entire image. Alternatively, the gradient magnitude can be computed for only a region of interest if one wants the best image quality just for that region. The selection for the computation depends on the application and image field-of-view being collected. For example, in an application where the sky is not important, the region below the sky is chosen as the region of interest. Below is a non-limiting example of a method for computing the gradient magnitude:

[$G$mag,$G$dir]=imgradient($I$) returns the gradient magnitude, $G$mag, and the gradient direction, $G$dir, for the grayscale or binary image $I$.

The algorithmic approach taken in imgradient for each of the listed gradient methods is to first compute directional gradients, Gx and Gy, with respect to the x-axis and y-axis. The x-axis is defined along the columns going tight and the y-axis is defined along the rows going down. The gradient magnitude and direction are then computed from their orthogonal components Gx and Gy.

Once the image gradient is computed, the minimum and maximum values are determined. The minimum and maximum values are divided into L levels (e.g., 10-20 levels), or bins. Each level value is then known. For example, if the minimum and maximum values are 0 and 1.00, respectively, and L=10 is chosen, then level 1 is 0-10, level 2 is 10-20 . . . level 10 is 90-100. In histogram jargon, the middle point is the value; therefore, the values for levels 1, 2, 3 . . . 10 are 5, 15, 25 . . . and 95. The information entropy of an image according to the principles of the present invention is defined as:

$$E = -\left(\sum_{i=0}^{L} P_c^i \log P_c^i\right), \quad (1)$$

where $P_c^i$ is the probability of the image gradient at level i and can be calculated by the gradient-magnitude histogram. L is the number of bins in the histogram, which is a count of a number of pixels in each of the range of the image gradient magnitude. If each contrast level has the same probability (i.e., uniform distribution), then the contrast entropy is maximized. The maximal value of the entropy is the following:

$$E_{max}=\log(L).$$

For a given scene, entropy in an image of a scene changes as exposure value is varied, and it reaches a maximum for that scene when $E_{max}$−E is minimal, which is demonstrated by Rahman et al. (see Literature Reference No. 4) with brightness entropy.

(3.2) Mask

In the outdoor environment, large contrast variations often occur in the middle part of an image, between sky and ground. Thus, it is necessary to be able to emphasize regions of interest (e.g., the middle part) and ignore the disturbing effect from sky (or other regions of no interest). The regions of interest are typically located in the middle and bottom image parts, although it is possible for the region of interest to be located at the top of the image as well. Therefore, an image is divided into multiple parts (i.e., blocks/subsections) with different weights. The weights are set based on region of interest selection, where a weight is set for each region. For example, a user may set a low weight for the sky and medium weight for a middle of the image.

Figure 3:
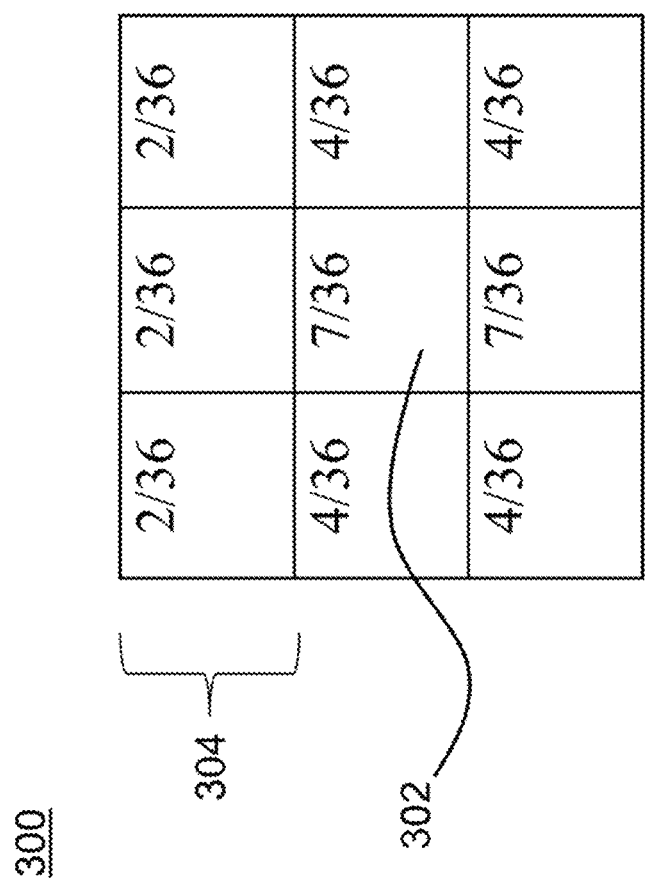
FIG. 3 is a table illustrating a mask with weights according to the principles of the present invention.

As a non-limiting example, an image is divided into N=9 parts, as depicted in the FIG. 3, which illustrates a mask 300 with weights. The fractions are the weights chosen by the user and denote their relative importance, or weights, assigned to each part. However, weights are not required per se. For instance, one could have a single region (N=1) for a whole image. If there are multiple regions (N>1), it allows for different weights. High fractions represent high weights so that the system weights these areas during analysis. For example, 7/36 is the middle of the image 302 and, therefore, given the highest ad hoc weight. The top row 304 is sky and minimally ad hoc weighted (2/36), since not much correction is wanted in this area and it is not of interest. In the example shown in FIG. 3, all of the weights (fractions) of the 9 parts sum to 1. The contrast entropy of each image block is weighted and the weighted sum is determined according to the following:

$$E_{image} = \sum_{i=1}^{N} \omega_i E_i, \quad (2)$$

where $E_i$ is calculated with Equation (1) for each image block i, where w represents weight. For various embodiments, the goal is to maximize the weighted sum.

(3.3) Exposure Value

To perform auto exposure, there are typically three parameters which are used to control exposure: aperture, exposure time, and signal gain. However, by increasing the signal gain, the noise is increased as well. As a consequence, signal gain is rarely used for the purpose of auto exposure. Not all cameras provide the possibility to change aperture. The imaging community (such as that described in Literature Reference No. 2) uses an exposure value (EV) to specify the relationship between aperture (F) and exposure time (T) according to the following:

$$EV = \log_2 \frac{F^2}{T}. \quad (3)$$

EV makes the exposure independent of specific aperture (e.g., F/8 at 1/100 seconds is the same EV as F/4 at 1/400 seconds.

(3.4) Image Entropy Versus Exposure Value

Figure 4:
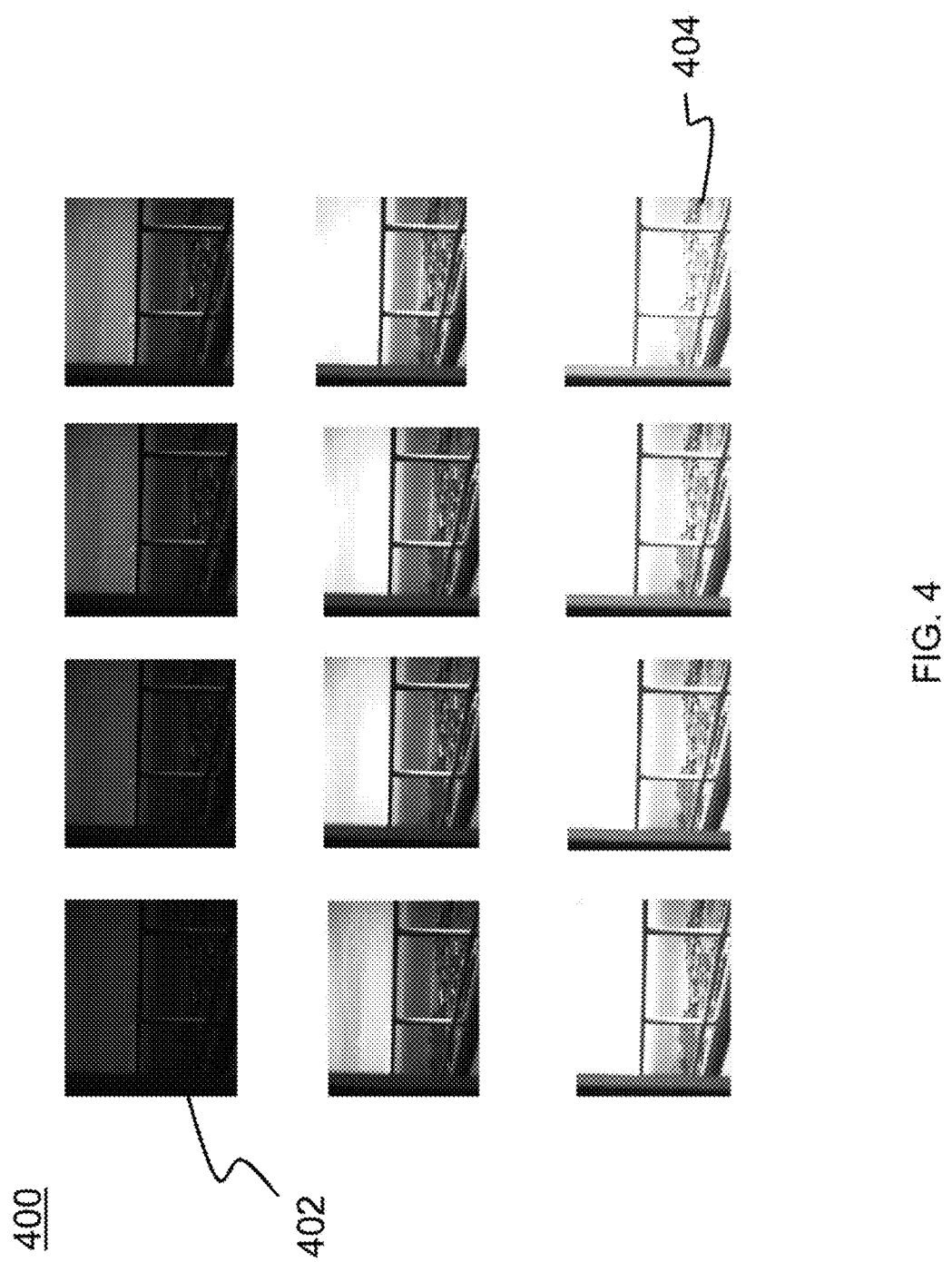
FIG. 4 is an illustration of image samples from an outdoor sequence with different exposure values according to the principles of the present invention.

In experimental studies, a set of images with different exposure values (determined according to equation 3) were captured in an outdoor environment. As a non-limiting example, the exposure value varied from 3 to −8 (step size of 1). The set of images 400 is shown in FIG. 4, which shows EV and image quality. The top left image 402 has an EV of 3, decreasing from left to right, then top to bottom. The last image 404 on the bottom tight has an EV of −8.

Figure 5:
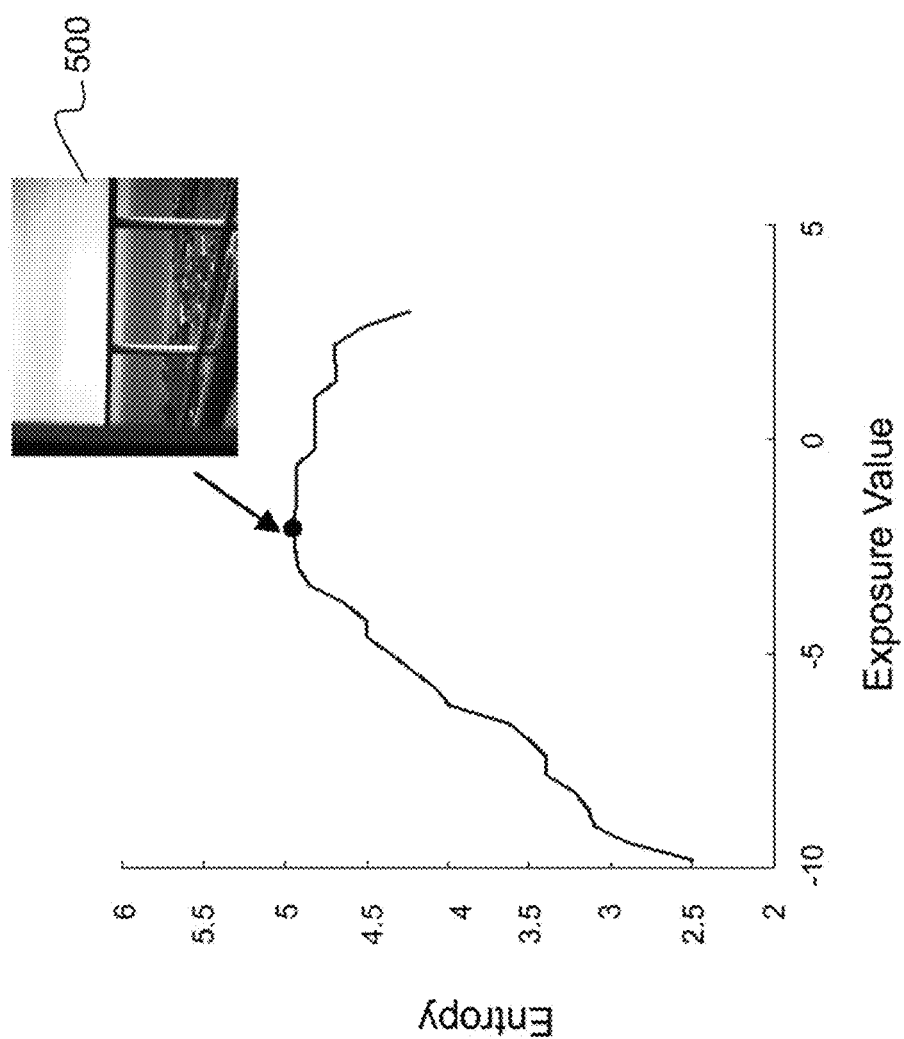
FIG. 5 is a plot illustrating entropy versus exposure values for the image samples from the outdoor scene depicted in FIG. 4 according to the principles of the present invention.

The relationship between image entropies and their corresponding exposure values for the set of images in FIG. 4 is depicted in the plot of FIG. 5. Along the x-axis of the plot is exposure value (EV), and along the y-axis is image contrast entropy. As shown, the output image with the maximal entropy 500 has the best image quality. Since image quality is related to the subjective perception of an image (i.e., a human looking at a photograph), it is unable to be defined. For the purposes of the present application, image quality is considered "good" when a human feels comfortable looking at the image and enough information in the image is displayed.

(3.5) Auto Exposure

According to experimental studies of the system described herein, contrast entropy can measure the image quality and indicate Whether the exposure value of the camera is optimized. Therefore, the AE problem can be defined as an optimization problem, and the maximum contrast entropy can be used as the optimization goal.

Referring to the plot in FIG. 5, starting from EV=3, the entropy is at its minimal value, and its corresponding output image is dark (i.e., low entropy, shown in top left 402 of FIG. 4). Next, as the EV decreases, the entropy increases to reach its maximal value when the EV is properly set for the camera. Entropy then decreases as the EV decreases. Ideally, the variation of the entropy should monotonically increase and decrease. In Literature Reference No. 2, the authors stop searching for the optimal EV when the entropy starts to decrease. However, due to noise and dynamic scenes, the entire range of the exposure values that the camera is allowed is processed in the present invention to avoid trapping into local maxima. Additionally, the images are smoothed using, as a non-limiting example, a median filter smoothing before calculating contrast entropy to reduce the noise effects. To speed up, EV is changed fast (i.e., large steps) when its corresponding entropy of the output image is far below the maximal value $E_{max}$ and slow (i.e., small steps) when the entropy is close to $E_{max}$. A large EV is typically around 3 and delta δ is typically chosen as 1. Therefore, the steps are changing i steps of 1 at the most. The steps become smaller δ/5 when entropy is large or nearing maximum. The maximum entropy equation is specified above and is a known number for L levels in the gradient magnitude histogram. Therefore, for L=10, $E_{max}$=log(10). When one is within 25% of this max value, one is "close". Otherwise, one is "far". While this gradation scheme is described in this embodiment, one could also choose a gradation scheme instead of a near/far decision and, thus, choose finer EV step changes instead of the two in this embodiment (i.e., δ or δ/5).

The steps of the process flow for auto exposure control according to the principles of the present invention are listed below.

1. Initialize EV=3 (darkest)
2. Iterate
   a) Set EV and capture image. The image is captured as a whole, but the estimate of contrast entropy (below) uses parts.
   b) Calculate contrast entropy using Equation 3.
   c) if (entropy<<$E_{max}$)

Figure 6A:
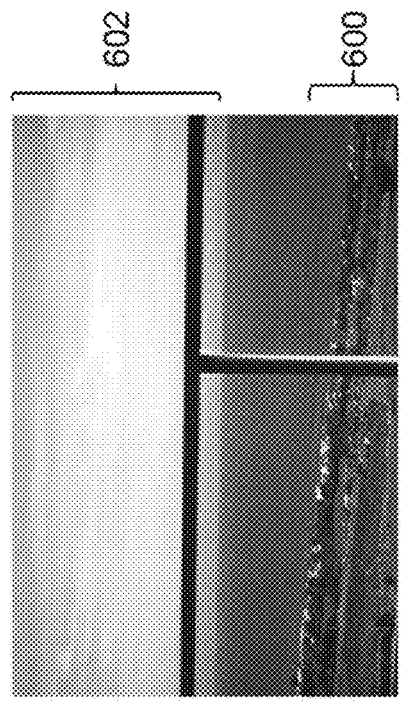
FIG. 6A is an image captured after automatic exposure (AE) using a prior art color entropy based process.
Figure 6B:
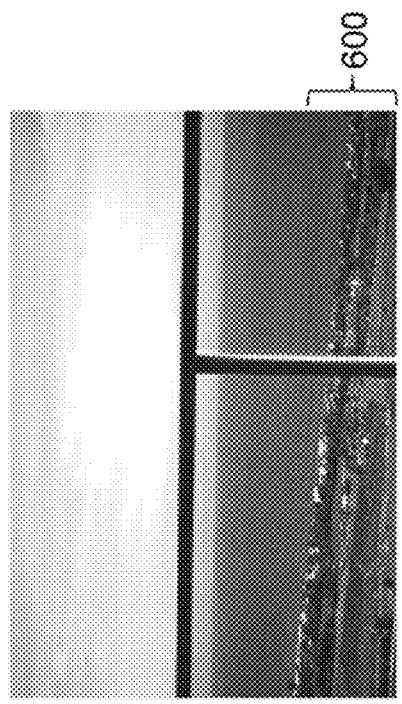
FIG. 6B is an image captured after AE using the contrast entropy based process according to the principles of the present invention.
Figure 6C:
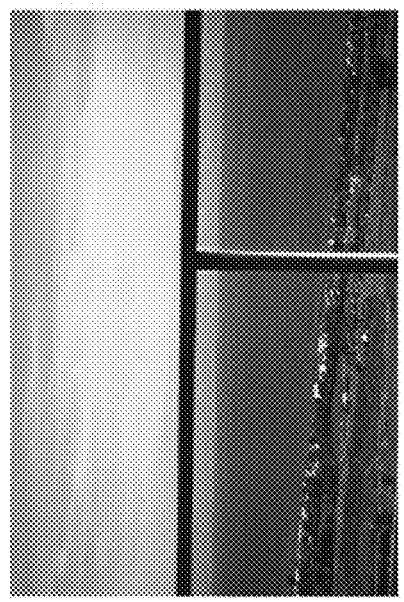
FIG. 6C is an image captured after AE with more weights put on regions of interest according to the principles of the present invention.

EV=EV−δ;

else
   EV=EV−δ/5, where δ represents maximum EV change in one step. 5 was selected ad hoc. It could also have been 4, 6, 10, etc., provided that the fraction represents a smaller (fine) step size.
   d) Save the best EV with the highest entropy
   Until EV<−10 (brightest)
3. Set the best EV (3.6) Experimental Results For comparison purposes in experimental studies, the system according to the principles of the present invention was compared to the method described in Literature Reference No. 3, which uses color entropy to measure the image quality. The optimal EV was set when the color entropy reached the maximal value. FIG. 6A is an image captured after AE using the color entropy based process described in Literature Reference No. 3. The image appears dim. FIG. 6B is an image captured after AE using the contrast entropy based system according to the principles of the present invention. The image is brighter than the image in FIG. 6A, and more information is displayed. However, the bottom part of the image 600 (i.e., the region of interest) is still dim, and the top part of the image 602 (i.e., the sky) contains too much information of no interest. Therefore, more weights are put on the region of interest in the bottom part of the image 600. Once a set of weights is fixed, the system according to the principles of the present invention will return an adjusted image in real-time (e.g., 30 frames per second). The adjustment of weights is usually done one time at the start of the process and then the system runs automatically in real-time. The output image then delivers more information at the bottom part of the image 600, as shown in FIG. 6C.

Figure 7:
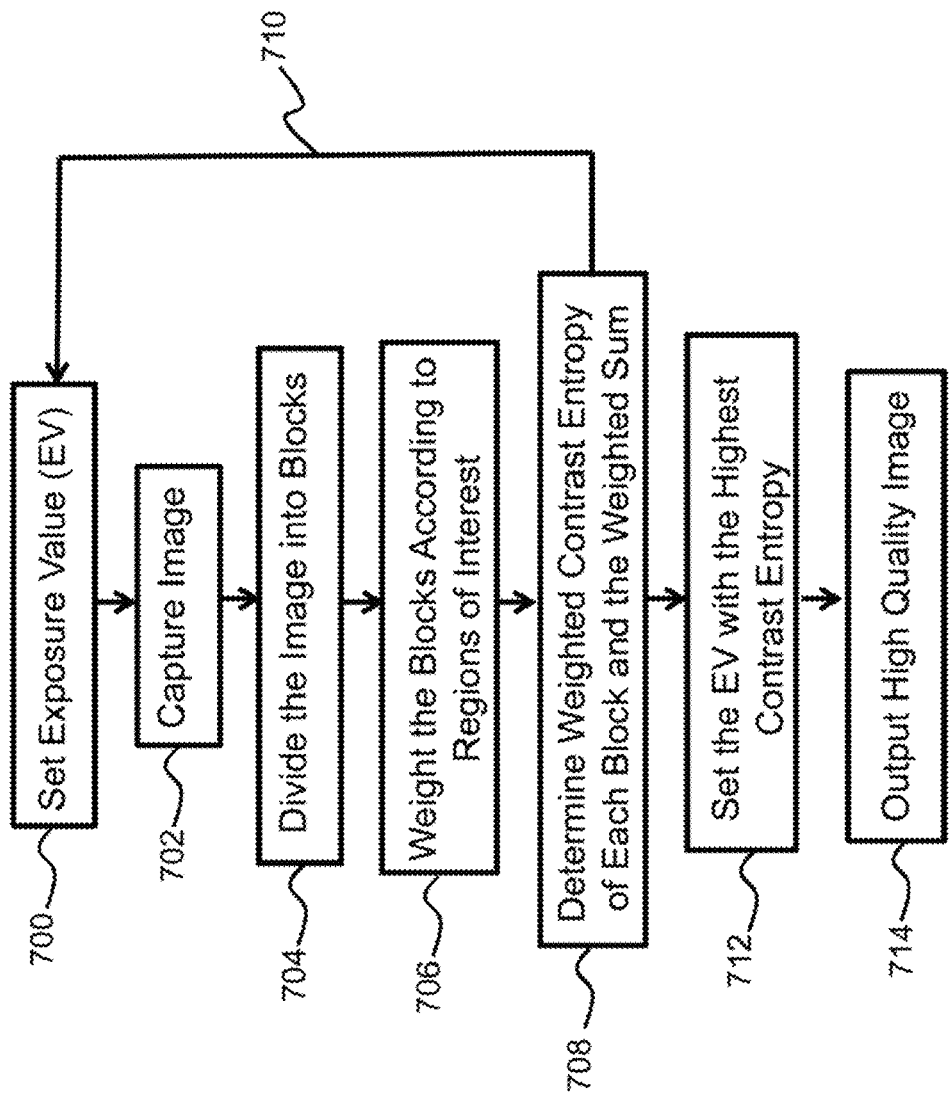
FIG. 7 is an illustration of a system for AE adjustment of an image sensor according to the principles of the present invention.

FIG. 7 depicts the system for real-time automatic exposure adjustment using contrast entropy according to the principles of the present invention. As described above, in a first step 700, an initial exposure value (EV) is set, and an image is captured in a second step 702. In a third step 704, the image is divided into a set of blocks, and the blocks are weighted according to regions of interest in the image in a fourth step 706. Contrast entropy is computed for each block in a fourth step 706. Then, in a fifth step 708, the weighted contrast entropy for each block is determined, and the weighted sum is computed. The process iterates 710 until the best EV with the highest contrast entropy is determined. In a sixth step 712, the system sets the EV with the highest contrast entropy, and a high quality image with the EV associated with the highest contrast entropy is output in a seventh step 714.

In summary, the system according to various embodiments uses contrast entropy to measure image quality. Since optimal camera parameters are often obtained by maximizing image content, the system described herein can work with any type of image sensor and robustly handles difficult lighting conditions. Experimental studies showed that contrast-based entropy better represents content information of an output image compared to brightness entropy or RGB color entropy. The system according to various embodiments focuses on a main region of interest, which can minimize the effect of sky and can prevent loss of information in one or more regions of interest. The present invention will work with any commercial camera that has exposure control available, including mobile phone cameras.

What is claimed is:

1. A system for automated exposure adjustment using contrast entropy, the system comprising:
    one or more processors and a non-transitory computer-readable medium having executable instructions encoded thereon such that when executed, the one or more processors perform operations of:
        capturing a plurality of images using an image sensor, each of the images being captured at a distinct exposure value;
        for each image, determining a gradient magnitude;
        determining a probability distribution of each gradient magnitude;
        using the probability distribution, determining an entropy based on contrast for each of the plurality of images; and
        outputting a selected image from the plurality of images, the selected image having the largest entropy based on contrast among the plurality of images.

2. The system of claim 1, wherein each of the plurality of images comprises a plurality of subsections, and wherein determining the contrast entropy for each of the plurality of images further comprises:
    applying a weighted value to the contrast entropy of each subsection of each of the plurality of images.

3. The system of claim 2, wherein determining the contrast entropy for each of the plurality of images further comprises:
    summing the weighted values of the plurality of subsections for each of the plurality of images.

4. The system as set forth in claim 2, wherein the plurality of subsections are weighted based on regions of interest in each image.

5. The system as set forth in claim 1, wherein the one or more processors further perform an operation of adjusting the exposure value quickly when its corresponding contrast entropy is not close to a maximal value $E_{max}$.

6. The system as set forth in claim 1, wherein the one or more processors further perform an operation of adjusting the exposure value slowly when its corresponding contrast entropy value is close to a maximal value $E_{max}$.

7. The system as set forth in claim 1, wherein the contrast entropy is based on a function of a number of pixels of an image at various contrast levels.

8. The system as set forth in claim 1, wherein the contrast entropy is based on a function of a probability of an image gradient at various contrast levels.

9. The system as set forth in claim 1, wherein the contrast entropy E is determined according to the following:

$$E = -\left(\sum_{i=0}^{L} P_c^i \log P_c^i\right),$$

where $P_c^i$ is a probability of an image gradient at level i determined using a gradient-magnitude histogram, L is a number of bins in the gradient-magnitude histogram, and log denotes a logarithmic function.

10. A computer-implemented method for automated exposure adjustment using contrast entropy, comprising an act of causing one or more processors to execute instructions stored on a non-transitory memory such that upon execution, the one or more processors perform operations of:
    capturing a plurality of images using an image sensor, each of the images being captured at a distinct exposure value;
    for each image, determining a gradient magnitude;
    determining a probability distribution of each gradient magnitude;
    using the probability distribution, determining an entropy based on contrast for each of the plurality of images; and
    outputting a selected image from the plurality of images, the selected image having the largest entropy based on contrast among the plurality of images.

11. The method as set forth in claim 10, wherein each of the plurality of images comprises a plurality of subsections, and wherein determining the contrast entropy for each of the plurality of images further comprises:
    applying a weighted value to the contrast entropy of each subsection of each of the plurality of images.

12. The method as set forth in claim 11, wherein the plurality of subsections are weighted based on regions of interest in each image.

13. The method as set forth in claim 10, wherein the one or more processors further perform an operation of adjusting the exposure value quickly when its corresponding contrast entropy value is not close to a maximal value $E_{max}$.

14. The method as set forth in claim 10, wherein the one or more processors further perform an operation of adjusting the exposure value slowly when its corresponding contrast entropy value is close to a maximal value $E_{max}$.

15. A computer program product for automated exposure adjustment using contrast entropy, the computer program product comprising computer-readable instructions stored on a non-transitory computer-readable medium that are executable by a computer having a processor for causing the processor to perform operations of:

capturing a plurality of images using an image sensor, each of the images being captured at a distinct exposure value;

for each image, determining a gradient magnitude;

determining a probability distribution of each gradient magnitude;

using the probability distribution, determining an entropy based on contrast for each of the plurality of images; and outputting a selected image from the plurality of images, the selected image having the largest entropy based on contrast among the plurality of images.

16. The computer program product as set forth in claim 15, wherein each of the plurality of images comprises a plurality of subsections, and wherein determining the contrast entropy for each of the plurality of images further comprises:

applying a weighted value to the contrast entropy of each subsection of each of the plurality of images.

17. The computer program product as set forth in claim 16, wherein the plurality of subsections are weighted based on regions of interest in each image.

18. The computer program product as set forth in claim 15, further comprising instructions for causing the processor to perform an operation of adjusting the exposure value quickly when its corresponding contrast entropy value is not close to a maximal value $E_{max}$.

19. The computer program product as set forth in claim 15, further comprising instructions for causing the processor to perform an operation of adjusting the exposure value slowly when its corresponding contrast entropy value is close to a maximal value $E_{max}$.

* * * * *